(No Model.)
L. F. HERRICK.
WHIP.
No. 361,763. Patented Apr. 26, 1887.
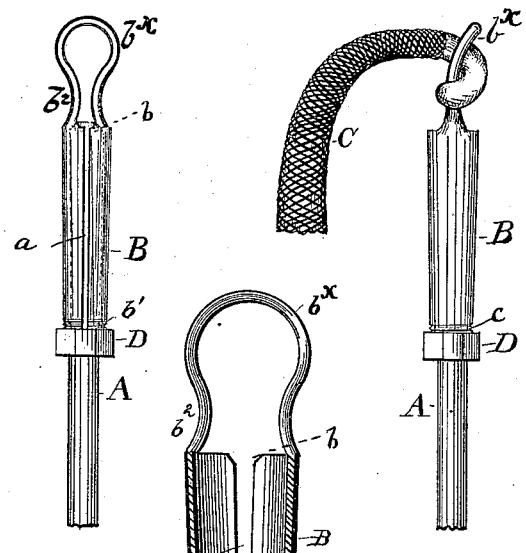
Witnesses:
Bucher Stowe,
Josephine M. Godman
Inventor,
Leroy F. Herrick,
By Joshua B. Webster Atty.

UNITED STATES PATENT OFFICE.

LEROY F. HERRICK, OF STOCKTON, CALIFORNIA.

WHIP.

SPECIFICATION forming part of Letters Patent No. 361,763, dated April 26, 1887.

Application filed July 10, 1886. Serial No. 207,641. (No model.)

*To all whom it may concern:*

Be it known that I, LEROY F. HERRICK, a citizen of the United States, residing at Stockton, in the county of San Joaquin and State of California, have invented certain new and useful Improvements in Whip-Lash Fasteners, of which the following is a specification, reference being had therein to the accompanying drawings.

My invention relates to a whip-lash fastener; and my object is to employ a tapered tube screw-threaded and split, having formed integral with it a loop adapted to receive a slip-noose of the lash, as will be fully understood from the following description and claim, when taken in connection with the annexed drawings, in which—

Figure 1 is a side view of the improved clip without the lash, showing the tapered and threaded clamping portions of the socket and a nut holding the same on the whip-stock. Fig. 2 is a side view of Fig. 1. Fig. 3 is a vertical section centrally taken through the device.

Referring to the figures by letters, A designates the whip-stock end of an ordinary or well-known whip. B designates my improved tip, socket, or lash-fastener. This fastener is split diametrically and longitudinally, and it is tapered from the point $b$ to the point $b'$, as clearly shown in the several figures of the drawings. The lower end of this split tube is screw-threaded externally, and the threads (indicated at $c$) are tapered to correspond with the tapered split tube or socket. The upper end of this split tube has formed on it a loop having a contracted neck, $b^2$. This loop is integral with the two tapered limbs constituting the socket B, which socket, I will now state, is smooth interiorly.

In combination with this tapered socket I employ an interiorly-wedged tapered nut, D, which is adapted to contract the lower tapered threaded ends of the two clamping-limbs of the socket. I am well aware that a clip having an eye terminated by limbs adapted to the external contour of a cable with a slip-band is not new; neither is a split externally threaded socket provided with a nut and a flexible lash-loop new; neither is it new in a whip-lash attachment to secure a flexible loop to the whip-stock proper by means of a ferrule, all of which I broadly disclaim.

What I do claim is—

The combination, with a whip-handle, of the whip-lash fastener, consisting of a tapering metallic socket split longitudinally and having external threads at its smaller end, a plain interior, and an integral shouldered loop at its larger end, and the nut having a tapered tapped bore and adapted to tighten the branches of the socket upon the whip-stock, substantially as specified.

In testimony whereof I affix my signature in presence of two witnesses.

LEROY F. HERRICK.

Witnesses:
 JOSHUA B. WEBSTER,
 ELIHU B. STOWE.